United States Patent
Parasuram et al.

(10) Patent No.: US 11,952,014 B2
(45) Date of Patent: Apr. 9, 2024

(54) BEHAVIOR PREDICTIONS FOR ACTIVE EMERGENCY VEHICLES

(71) Applicant: Waymo LLC, Mountain View, CA (US)

(72) Inventors: Aishwarya Parasuram, Sunnyvale, CA (US); Alisha Saxena, Bellevue, WA (US); Kai Ding, Santa Clara, CA (US); Stéphane Ross, San Jose, CA (US); Xin Liu, Mouintain View, CA (US); Anoosha Sagar, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 162 days.

(21) Appl. No.: 17/514,713

(22) Filed: Oct. 29, 2021

(65) Prior Publication Data

US 2023/0133419 A1    May 4, 2023

(51) Int. Cl.
*B60W 60/00* (2020.01)
*B60W 50/00* (2006.01)
*G05B 13/02* (2006.01)

(52) U.S. Cl.
CPC .... *B60W 60/0027* (2020.02); *B60W 50/0097* (2013.01); *G05B 13/0265* (2013.01); *B60W 2554/4045* (2020.02); *B60W 2555/60* (2020.02)

(58) Field of Classification Search
CPC ......... B60W 60/0027; B60W 50/0097; B60W 2554/4045; B60W 2555/60; B60W 60/0011; B60W 60/0015; G05B 13/0265
See application file for complete search history.

(56) References Cited

U.S. PATENT DOCUMENTS

| | | | |
|---|---|---|---|
| 7,515,065 B1 | 4/2009 | Bygrave et al. | |
| 8,676,427 B1 | 3/2014 | Ferguson et al. | |
| 8,700,251 B1 | 4/2014 | Zhu et al. | |
| 9,278,689 B1 | 3/2016 | Delp | |

(Continued)

FOREIGN PATENT DOCUMENTS

| | | |
|---|---|---|
| DE | 102011102024 | 4/2012 |
| JP | 2002245588 | 8/2002 |

OTHER PUBLICATIONS

Chai et al., "MultiPath: Multiple Probabilistic Anchor Trajectory Hypotheses for Behavior Prediction," CoRR, Oct. 2019, arxiv.org/abs/1910.05449, 14 pages.

(Continued)

*Primary Examiner* — Christian Chace
*Assistant Examiner* — Katherine Marie Fitzharris
(74) *Attorney, Agent, or Firm* — Fish & Richardson P.C.

(57) ABSTRACT

Methods, systems, and apparatus, including computer programs encoded on a computer storage medium, that obtain scene features in an environment that includes an autonomous vehicle and a target agent at a current time point; determine whether the target agent is an emergency vehicle that is active at the current time point; generate from the scene features, an input (i) that includes the scene features and (ii) that indicates whether the target vehicle is an emergency vehicle that is active at the current time point; and process the input using a machine learning model that is configured to generate a behavior prediction output for the target agent that characterizes predicted future behavior of the target agent after the current time point.

17 Claims, 5 Drawing Sheets

(56) References Cited

U.S. PATENT DOCUMENTS

| | | |
|---|---|---|
| 9,821,807 B2 | 11/2017 | Herbach et al. |
| 9,921,581 B2 | 3/2018 | Tseng et al. |
| 10,059,334 B1 | 8/2018 | Zhu et al. |
| 10,126,136 B2 | 11/2018 | Iagnemma |
| 10,331,129 B2 | 6/2019 | Iagnemma et al. |
| 10,332,396 B1 | 6/2019 | Christensen et al. |
| 10,600,326 B2 | 3/2020 | Kim et al. |
| 10,650,677 B2 | 5/2020 | Silver et al. |
| 10,796,204 B2 | 5/2020 | Silver et al. |
| 10,796,571 B2 | 10/2020 | Kim et al. |
| 10,825,341 B1 | 11/2020 | Grant |
| 10,991,181 B1 | 4/2021 | Nepomuceno et al. |
| 11,055,624 B1* | 7/2021 | Sapp .................. G06N 7/01 |
| 2008/0161987 A1 | 7/2008 | Breed |
| 2016/0252905 A1 | 9/2016 | Tian et al. |
| 2017/0113689 A1 | 4/2017 | Gordon et al. |
| 2017/0213462 A1* | 7/2017 | Prokhorov ............ G08G 1/166 |
| 2018/0079422 A1 | 3/2018 | Weinstein-Raun |
| 2018/0364732 A1 | 12/2018 | Yaldo et al. |
| 2019/0155283 A1 | 5/2019 | Herbach et al. |
| 2019/0329782 A1 | 10/2019 | Shalev-Shwartz et al. |
| 2020/0023859 A1 | 1/2020 | Schmitt et al. |
| 2020/0132011 A1* | 4/2020 | Kitagawa ............. G06N 3/084 |
| 2020/0406894 A1* | 12/2020 | Akella ................ B60W 10/18 |
| 2021/0201676 A1* | 7/2021 | Tariq ............... G08G 1/096725 |
| 2021/0278837 A1 | 9/2021 | Fairfield et al. |

OTHER PUBLICATIONS

Tolstaya et al., "Identifying Driver Interactions via Conditional Behavior Prediction," CoRR, Apr. 2021, arXiv:2104.09959, 7 pages.

* cited by examiner

BEHAVIOR PREDICTIONS FOR ACTIVE EMERGENCY VEHICLES

TECHNICAL FIELD

This specification relates to autonomous vehicles.

Autonomous vehicles include self-driving cars, motorcycles, trucks, buses and similar vehicles. Autonomous vehicles use a variety of on-board sensors and computer systems to detect nearby objects and use such detections to make control and navigation decisions.

SUMMARY

This specification describes a system implemented as computer programs on one or more computers in one or more locations that generates behavior prediction data for active emergency vehicles that are in the vicinity of an autonomous vehicle, that is, that are within the sensing range of one or more sensors of the autonomous vehicle.

One aspect features obtaining scene features in an environment that includes an autonomous vehicle and a target agent at a current time point; determining whether the target agent is an emergency vehicle that is active at the current time point; generating from the scene features, an input (i) that includes the scene features and (ii) that indicates whether the target vehicle is an emergency vehicle and, if so, whether the emergency vehicle is active at the current time point; and processing the input using a machine learning model that is configured to generate a behavior prediction output for the target agent that characterizes predicted future behavior of the target agent after the current time point.

One or more of the following features can be included. The behavior prediction output can include a trajectory prediction output. The behavior prediction output can include a driving action prediction output. The scene features can include features of: (i) the environment and (ii) the emergency vehicle. Each behavior prediction output can represent a likelihood that the autonomous emergency vehicle will perform a predicted driving maneuver in a future time window after the current time point. The predicted driving maneuver can be at least one of making a U-turn, running a red light or stop sign, turning from a central travel lane, stopping in a no-stopping zone, driving against traffic and passing in a no-passing zone. Based on determining that a set of criteria are satisfied, the machine learning model can be selected from a set of one or more machine learning models, where the selected machine learning model can be configured to generate one or more behavior predictions.

Particular embodiments of the subject matter described in this specification can be implemented so as to realize one or more of the following advantages. The techniques described below can be used to predict the behavior of an active emergency vehicle that is in the vicinity of an autonomous vehicle. Predicting the behavior of an active emergency vehicle allows the autonomous vehicle to navigate safely without interfering with the operation of the active emergency vehicle. For example, the techniques described below can enable an autonomous vehicle to navigate such that it provides the active emergency vehicle with ample room to travel to its destination rapidly. In addition, the techniques described below can be used to predict driving maneuvers of an active emergency vehicle that are uncommon among agents that are not active emergency vehicles. For example, active emergency vehicles commonly travel rapidly and run red lights, which other agents do less frequently. Predicting such behavior of an active emergency vehicle allows an autonomous vehicle to evaluate potential maneuvers of active emergency vehicles and to yield properly to the active emergency vehicle.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

To navigate safely through an environment to an intended destination, an autonomous vehicle must predict the trajectories of other agents in the environment. Such agents can include other vehicles, such as other cars, bicycles, trucks, scooters, etc., and pedestrians.

Another class of agent, active emergency vehicles, which can include fire trucks, ambulances, police cars, and so on, exhibit behaviors that can strongly deviate from the behavior of other types of agent. For example, to minimize the time needed to reach a destination, active emergency vehicles can travel faster than other agents in an environment, and can follow paths that are unavailable to non-emergency vehicles, such as making a U-turn in the middle of a roadway, traveling against traffic and running a red light. Thus, some models that accurately predict the behavior of most agents in a scene, including emergency vehicles that are not active, can fail to predict the behavior of active emergency vehicles accurately. An active emergency vehicle can be an emergency vehicle with lights flashing or with an active siren.

This specification describes how an on-board system of an autonomous vehicle can generate behavior predictions for active emergency vehicles in the vicinity of the autonomous vehicle (that is, within the sensing range of one or more sensors of the autonomous vehicle).

The on-board system can use the behavior predictions to guide the operation of the autonomous vehicle. In particular, the on-board system can generate a behavior prediction by obtaining scene features, determining that an agent in the scene is an emergency vehicle that is active at the current time point, and using the scene features as input to one or more machine learning models that each generate a prediction that characterizes the predicted travel of the active emergency vehicle.

The on-board system can use the behavior prediction to perform actions, i.e., to control the vehicle, which causes the vehicle to operate more safely, including not interfering with the active emergency vehicle. For example, the on-board system can generate fully-autonomous control outputs to apply the brakes of the vehicle to avoid an interaction with an agent that is expected to pull over at a location that would be atypical when an active emergency vehicle is not present.

These features and other features are described in more detail below.

Figure 1A:
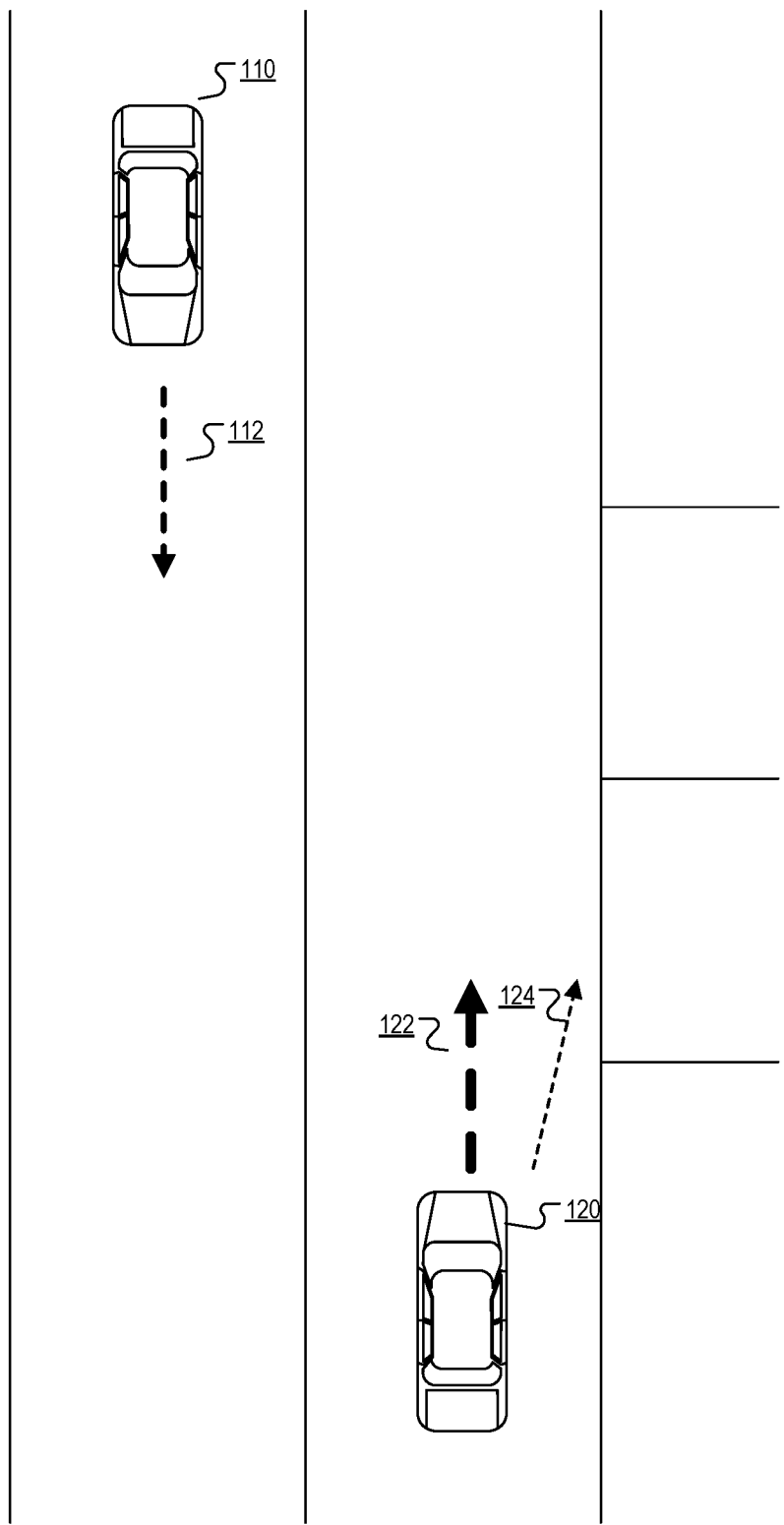
FIGS. 1a and 1b are diagrams of vehicles traveling on a roadway.
Figure 1B:
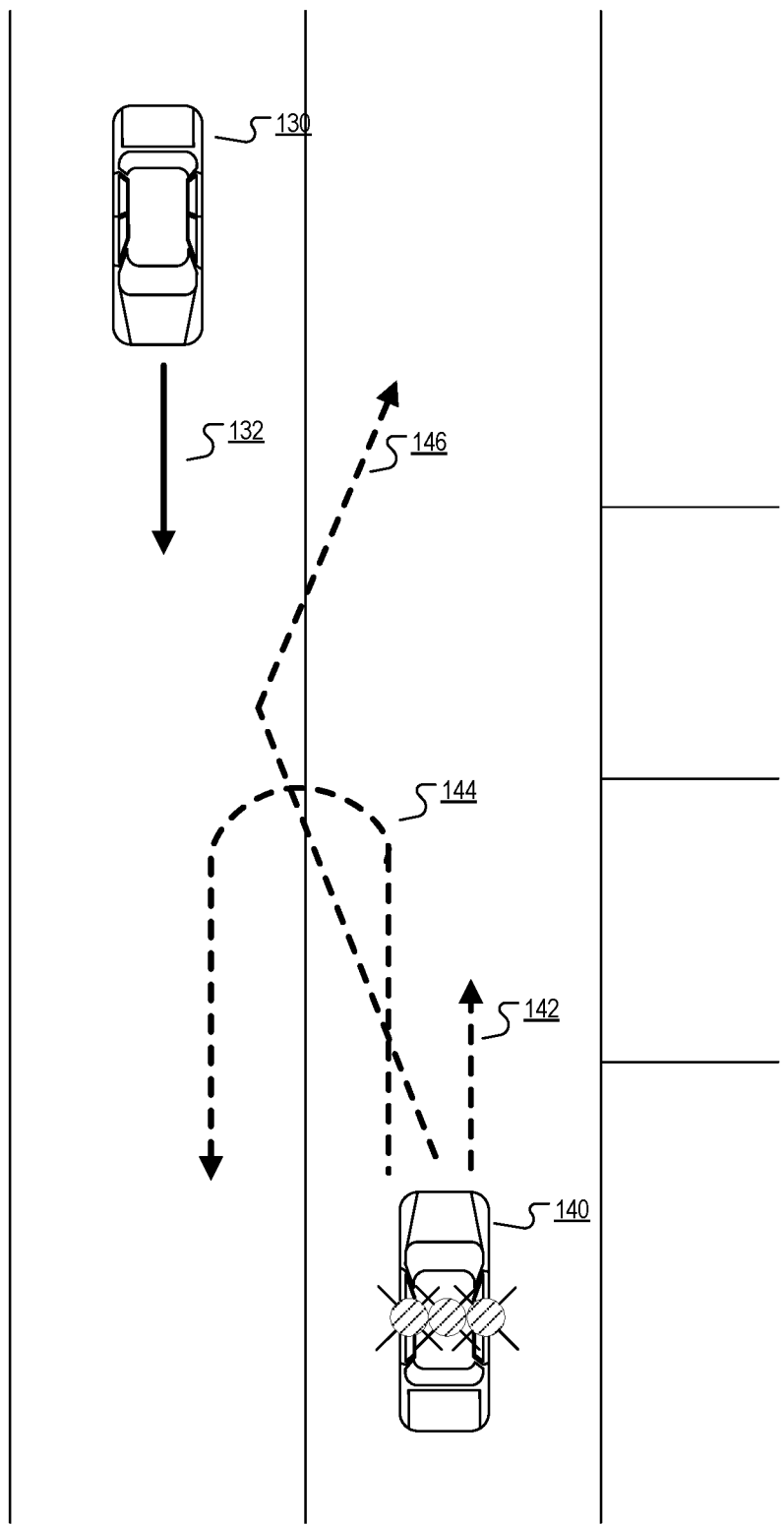

FIGS. 1a and 1b are diagrams of vehicles traveling on a roadway. In FIG. 1a, an autonomous vehicle 110 is traveling in the left lane with another agent 120 (that is not an active emergency vehicle) traveling in a different lane and in the opposite direction from the autonomous vehicle 110. In this case, the agent 120 is predicted to follow a forward trajectory 122 with a high probability, as illustrated by the thick line. In a second trajectory 124, the agent 122 angles toward parking, but this trajectory is predicted with low probability, as illustrated by the thin line. In this example, there are no predicted trajectories that cause an interaction between the trajectory 112 of the autonomous vehicle 110 and a trajectory of the other agent 120.

In FIG. 1b, an autonomous vehicle 130 is again traveling in the left lane, but in this figure, the agent 140 traveling in the opposite direction is an active emergency vehicle. In addition to traveling straight 142, the active emergency vehicle 140 is, in some cases, permitted to follow trajectories that are not permitted for other vehicles. For example, the active emergency vehicle 140 might make a U-turn 144 in the middle of the road or cross into incoming traffic 146 to navigate around a vehicle in its lane of travel. Predicting the possibility that the active emergency vehicle 140 might follow trajectories 144, 146 not permitted for other vehicles can be advantageous as it can permit the control system of the autonomous vehicle 130 to adjust the behavior of the autonomous vehicle.

Figure 2:
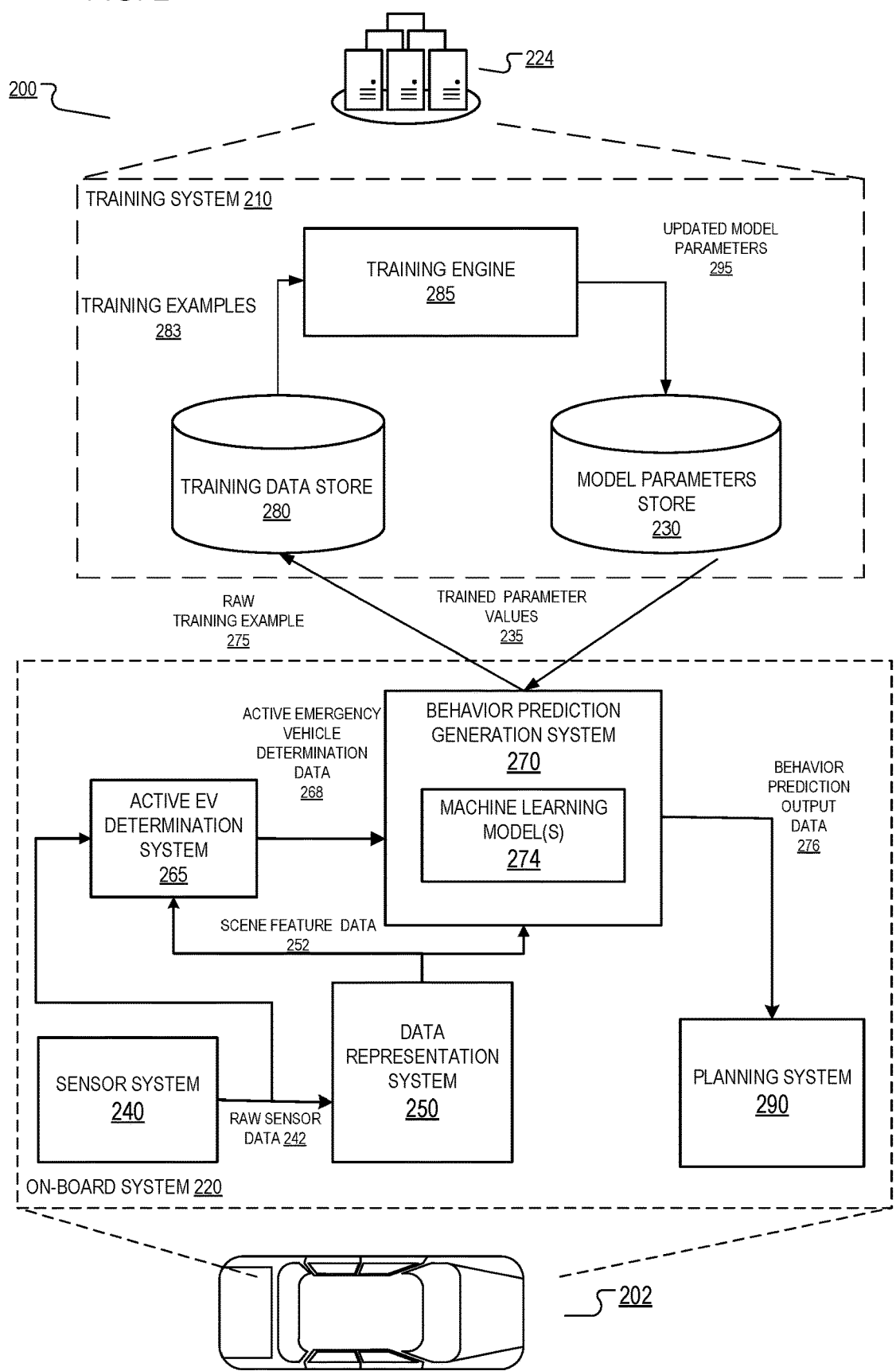
FIG. 2 is a diagram of an example system for creating behavior predictions for an active emergency vehicle.

FIG. 2 is a diagram of an example system for creating behavior predictions for an active emergency vehicle. The system 200 can include an on-board system 220 and a training system 210.

The on-board system 220 is located on-board a vehicle 202 and makes control decisions for the autonomous vehicle. Accordingly, it includes components used to detect and understand the environment, then to plan a safe path. The on-board system 220 is composed of hardware and software components, some or all of which are physically located on-board a vehicle 202. The components of the on-board system 220 are described in more detail below.

In some cases, the on-board system 220 can make fully-autonomous or partly-autonomous driving decisions (i.e., driving decisions taken independently of the driver of the vehicle 202), present information to the driver of a vehicle 202 to assist the driver in operating the vehicle safely, or both. For example, in response to determining that another agent might interact with the vehicle 202, the on-board system 220 may autonomously apply the brakes of the vehicle 202 or otherwise autonomously change the trajectory of the vehicle 202 to prevent an unwanted interaction between the vehicle 202 and the agent.

Although the vehicle 202 in FIG. 2 is depicted as an automobile, and the examples in this document are described with reference to automobiles, in general the vehicle 202 can be any kind of vehicle. For example, besides an automobile, the vehicle 202 can be another kind of autonomous vehicle that travels along a roadway, e.g., a truck or a motorcycle. Moreover, the on-board system 220 can include components additional to those depicted in FIG. 2 (e.g., a collision detection system or a navigation system).

To enable the safe control of the autonomous vehicle 202, the on-board system 220 includes a sensor system 240 which enables the on-board system 220 to "see" the environment in the vicinity of the vehicle 202. More specifically, the sensor system 240 includes one or more sensors, some of which are configured to receive reflections of electromagnetic radiation from the environment in the vicinity of the vehicle 202. For example, the sensor system 240 can include one or more laser sensors (e.g., LIDAR laser sensors) that are configured to detect reflections of laser light. As another example, the sensor system 240 can include one or more radar sensors that are configured to detect reflections of radio waves. As another example, the sensor system 240 can include one or more camera sensors that are configured to detect reflections of visible light.

The sensor system 240 continually (i.e., at each of multiple time points) captures raw sensor data which can indicate the directions, intensities, and distances travelled by reflected radiation. For example, a sensor in the sensor system 240 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 240 can also include a combination of components that receive reflections of electromagnetic radiation, e.g., lidar systems that detect reflections of laser light, radar systems that detect reflections of radio waves, and camera systems that detect reflections of visible light.

The sensor subsystems 240 or other components of the vehicle 202 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 240 classify one or more groups of raw sensor measurements as being measures of respective other agents, the sensor subsystems 240 can compile the raw sensor measurements into a set of raw data 242, and send the raw data 242 to a data representation system 250.

The data representation system 250, also on-board the vehicle 202, receives the raw sensor data 242 from the sensor system 240 and additional data that characterizes the environment, i.e., roadgraph data that can identify driving lanes and optionally other features, e.g., driveways, parking areas and marked crossing zones, within roadways in the environment and generates scene feature data 252 that includes features that characterize the agents and environment in the vicinity of the vehicle 202.

The scene feature data 252 can include a broad range of data such as the type of agent (motor vehicle, pedestrian, cyclist, etc.), whether the agent is an emergency vehicle, the agent's location, size, speed, the standard deviation of speed, trajectory, vehicle lights, and so on. The scene feature data can further include data derived from the roadgraph data such as distance to road edge, and traffic information such as the state of other agents in the vicinity, traffic light status, etc. The scene feature data 252 can include these data both for a most recent sampling and for prior samplings, i.e., from a most recent time point and one or more earlier time points that are within a recent time window of the most recent time point.

The on-board system can augment the data available from the sensor system 240 by accessing data available in data repositories stored within the autonomous vehicle 202, or data repositories outside of, but coupled to, the autonomous vehicle, such as in a data center with the data available made to the autonomous vehicle over a cellular or other wireless network.

The data representation system 250 can provide the scene feature data 252 to an active emergency vehicle determination system 265 on-board the vehicle 202.

The active emergency vehicle determination system 265 can use the scene feature data 252 and raw sensor data 242 to determine whether an agent present in the scene feature data 252 is an active emergency vehicle.

The active emergency vehicle determination system 265 can pass to a behavior prediction generation system 270 active emergency vehicle determination data 268 indicating that a particular agent in the scene feature data 262 is an active emergency vehicle.

The behavior prediction generation system 270 can process input derived from the features and active emergency vehicle determination data 268 using each of one or more machine learning models. Each machine learning model can generate behavior prediction output data 276 for the active emergency vehicle that is in the vicinity of the autonomous vehicle 202. The behavior prediction output data 276 can include one or more behavior predictions for the active emergency vehicle. The behavior prediction output data 276 can also include, for each behavior prediction, a score that indicates the predicted likelihood that the active emergency vehicle will perform the behavior.

The behavior prediction output data 276 can include either or both of a trajectory prediction and a driving maneuver prediction. Examples of driving maneuvers can include performing U-turns, driving on the wrong side of the road, pulling over outside a parking zone, etc. A trajectory prediction specifies a future trajectory for the emergency vehicle, for example, as a prediction that defines a probability distribution over a space of possible future paths for the emergency vehicle.

The machine learning model 274 can be any appropriate type of machine learning model that can map a set of features to a behavior prediction. For example, a trajectory prediction can be produced by a recurrent neural network, and a driving maneuver prediction can be produced by a classification model such as a logistic regression model. Examples of features used by one or more machine learning models can include one or more of (a) raw sensor data 242, (b) scene feature data 252, and (c) external data, such as a roadgraph, all described above. External data can further include explicit signals relevant to trajectory predictions, for example, emergency radio traffic that indicates the location and trajectory of one or more active emergency vehicles.

The behavior prediction output data 276 can be delivered to a planning system. The planning system 290 can use the behavior prediction output data 276 to make fully-autonomous driving decisions, i.e., to update a planned trajectory for the vehicle 202. For example, the planning system 290 can generate a fully-autonomous plan to navigate the vehicle 202 to permit safe travel of the active emergency vehicle while also avoiding unwanted interactions with other agents in the environment. In a particular example, the on-board system 220 may provide the planning system 290 with data indicating that the active emergency vehicle is predicted to follow a trajectory or perform a driving maneuver that could cause interaction with the vehicle 202. In this example, the planning system 290 can generate fully-autonomous control outputs to apply the brakes of the vehicle 202 and adjust the steering of the vehicle 202 to angle the vehicle 202 to the outside of the lane, creating a larger space in which the active emergency vehicle can travel safely to its destination.

The fully-autonomous driving decisions generated by the planning system 290 can be implemented by a control system of the vehicle 202. For example, in response to receiving a fully-autonomous driving decision generated by the planning system 290 which indicates that the brakes of the vehicle should be applied, the control system may transmit an electronic signal to a braking control unit of the vehicle. In response to receiving the electronic signal, the braking control unit can mechanically apply the brakes of the vehicle.

The training system 210, which is associated with the on-board system 220, is responsible for generating trained parameter values 235 used by the on-board system 202 in one or more machine learning models 274.

The training system 210 includes a training data store 280 that stores the training data used to train the parameter values of each of the machine learning model 274. The training data store 280 receives raw training examples from vehicles operating in the real world. For example the training data store 280 can receive a raw training example 275 from the vehicle 202 and one or more other agents that are in communication with the training system 210. Each raw training example 275 can be processed by the training system 210 to generate a new training example used to train one or more machine learning models 274.

The raw training examples 275 can include a model input for at least one machine learning model 274. The raw training examples 275 can also include outcome data characterizing the travel behavior of an active emergency vehicle. This outcome data can be used to generate a training example for one or more of the machine learning models 274. For example, for a recurrent neural network that is configured to generate trajectories for an active emergency vehicle, training examples can include data representing actual observed trajectories for active emergency vehicles.

The training data store 280 provides training examples 283 to a training engine 285, also housed in the training system 210. The training engine 285 uses the training examples 283 to update the model parameters of the machine learning model 274, and provides the updated model parameters 295 to the model parameters store 230. Once the parameter values of the model 274 have been fully trained, the training system 210 can send the trained parameter values 235 to the on-board system 220, e.g., through a wired or wireless connection.

The training system 210 is typically hosted within a data center 224, which can be a distributed computing system having hundreds or thousands of computers in one or more locations.

Figure 3:
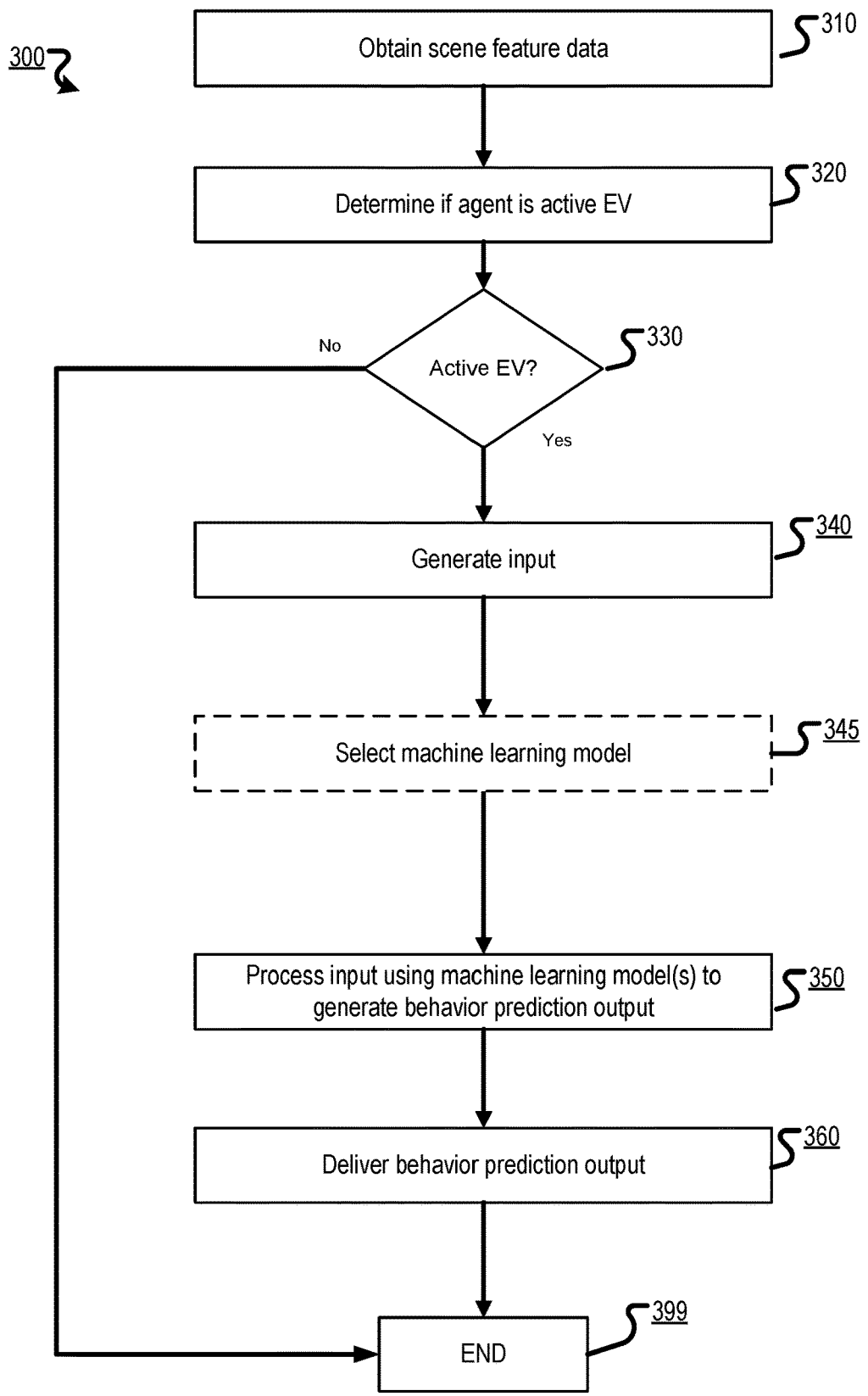
FIGS. 3 and 4 are flow diagrams of example processes for creating behavior predictions for an active emergency vehicle.

FIG. 3 is a flow diagram of an example process for creating behavior predictions for an active emergency vehicle. For convenience, the process 300 will be described as being performed by a system for creating behavior predictions for an active emergency vehicle, e.g., the system 200 of FIG. 2, appropriately programmed to perform the process.

In operation 310, the system obtains scene feature data. As described above, scene feature data can be obtained from sensors on the autonomous vehicle, other sensors in the environment and from one or more external data stores.

In operation 320, the system determines whether at least one agent is an active emergency vehicle. The system can determine that an agent is an active emergency vehicle using a variety of indications, including explicit signals, external signals, or combinations of those indications or other techniques. Note that it is not sufficient to determine that an agent is an emergency vehicle since an inactive emergency vehicle typically does not exhibit the same behavior as an active emergency vehicle.

In some implementations, the system can use explicit signals emitted by an agent to determine that the agent is an active emergency vehicle. Explicit signals can include visual indicators, such as flashing lights, and/or audible indicators, such as sirens. In one example, the system can compare audio data sensed by microphones on the autonomous vehicle to an audio data profile associated with an active emergency vehicle. If the sensed audio data matches the profile, the system can determine that the emergency vehicle has an active siren and is therefore an active emergency vehicle. In another example, the system can use the cameras on the autonomous vehicle to determine the size, shape and markings on an agent, and use those data to determine whether the vehicle is likely to be an emergency vehicle. In another example, the system can use the cameras on an autonomous vehicle to detect flashing lights. As one example, the system can determine that the emergency vehicle is active when the emergency vehicle has flashing lights. As another example, the system can determine that the emergency vehicle is active when the emergency vehicle has an active siren. As yet another example, the system can determine that the emergency vehicle is active only when the emergency vehicle has both an active siren and flashing lights.

In some implementations, the system determines whether the target agent is an active emergency vehicle based on a determination received by an external system. For example, data received by an autonomous vehicle over a network can indicate the location of an active emergency vehicle.

In decision operation 330, the system proceeds to operation 340 if the scene contains at least one active emergency vehicle; the system proceeds to operation 399 if the scene does not contain an active emergency vehicle.

In operation 340, the system generates an input that includes the scene features and indicates whether the target vehicle is an emergency vehicle and, if so, whether the emergency vehicle is active at the current time point. The system can encode the scene features using an encoder neural network. The system can encode an indication of whether the target agent is an active emergency vehicle as a binary value where zero indicates that the target agent is not an active emergency vehicle and one indicates that the target agent is an active emergency vehicle.

Some implementations include optional operation 345 in which the system can use criteria to select among multiple, specific machine learning models. A criterion can specify that, if the target agent is an active emergency vehicle, then a first machine learning model should be used, and if the target agent is not an active emergency vehicle, then a second machine learning model should be used. That is, the system can maintain a behavior prediction model that is specific to active emergency vehicles, and only use this model to generate the behavior prediction in response to determining that the agent is an active emergency vehicle.

The system can use complex criteria. For example, a first criteria might state that, if the vehicle is an active fire truck, select model A; a second criteria might state that, if the vehicle is an active police car, select model B; a third criteria might state that, if the vehicle is an active ambulance, select model C; and a fourth criteria might state that, if the vehicle is not an emergency vehicle, select model D. The system can evaluate the criteria to determine an appropriate machine learning model, and process an input using that machine learning model to generate a trajectory prediction, as described above.

Examples of such machine learning models can also include models for active emergency vehicles, models for emergency vehicles that are not active and model for non-emergency vehicles. In addition, models can also be specific to the type of emergency vehicle, such as police car, ambulance and fire truck, as noted above.

In operation 350, the system can process features that include features of the scene (as described above) and, in some implementation, a feature indicating whether the target agent is an active emergency vehicle using a machine learning model that is configured to generate behavior prediction output for the target agent. (In some implementations, the machine learning model was selected in operation 345.) The feature indicating whether the target agent is an active emergency vehicle can be a binary feature where 'true' indicates that the target agent is an active emergency vehicle and 'false' indicates that the target agent is not an active emergency vehicle.

In some implementations, when the target agent is an active emergency vehicle, as part of processing the features, the system can modify uncertainty-based features such as the standard deviations of velocity, heading, etc. to increase the uncertainty represented by the features. For example, the system can increase the standard deviation of such a feature by a configured amount, a configured percentage or by applying a configured function to the feature.

In various implementations: (i) the system processes only the binary feature indicating whether the target agent is an active emergency vehicle; (ii) the system only modifies uncertainty-based features based on the binary feature and then does not further process the binary feature; or (iii) the system processes the binary feature indicating whether the target agent is an active emergency vehicle and modifies uncertainty-based features.

The behavior prediction output can include: (i) a trajectory prediction output for the target agent that characterizes predicted future behavior of the target agent after the current time point, or (ii) a driving maneuver prediction output for the target agent that characterizes predicted future driving maneuver of the target agent after the current time point.

The machine learning model can be a deep learning model, such as a recurrent neural network or a convolutional neural network, a random forest, an inverse reinforcement learning model or a cost function optimization model.

In some implementations, a trajectory prediction output produced by the machine learning model can include one or more predicted trajectories and one or more scores associated with each predicted trajectory. Each score indicates a predicted likelihood that the agent will follow the associated predicted trajectory.

In addition, in some implementations, when the target agent is an active emergency vehicle, trajectories that have a score above a configured threshold can be smoothed into kinematically feasible geometries and speed profiles for emergency vehicles. For example, the system can use an inverse reinforcement learning model to generate such geometries.

In some implementations, a trajectory prediction output produced by the machine learning model can include a probability distribution over a space of possible trajectories. Examples of models that generate probability distributions include the models described in *Identifying Driver Interactions via Conditional Behavior Prediction*, available at arXiv:2104.09959 and *MultiPath: Multiple Probabilistic Anchor Trajectory Hypotheses for Behavior Prediction*, available at arXiv:2104.05449.

In some implementations, the driving maneuver prediction can include one or more scores that indicates, for each of one or more driving maneuvers, the likelihood that the agent will perform the driving behavior within a given time window after the current time. Examples of predicted driving maneuvers can include making a U-turn, running a red light or stop sign, turning from a central travel lane, stopping in a no-stopping zone, driving against traffic, passing in a no-passing zone, and other behaviors typically exhibited only by active emergency vehicles. If a score associated with a driving maneuver satisfies a configured threshold, the agent is predicted to perform that driving maneuver.

In operation 360, the system delivers the behavior prediction output. In some implementations, the system delivers the behavior prediction output to a planning system on the autonomous vehicle that is responsible for operating the vehicle, as described above.

In operation 399, the system ceases this processing iteration.

Figure 4:
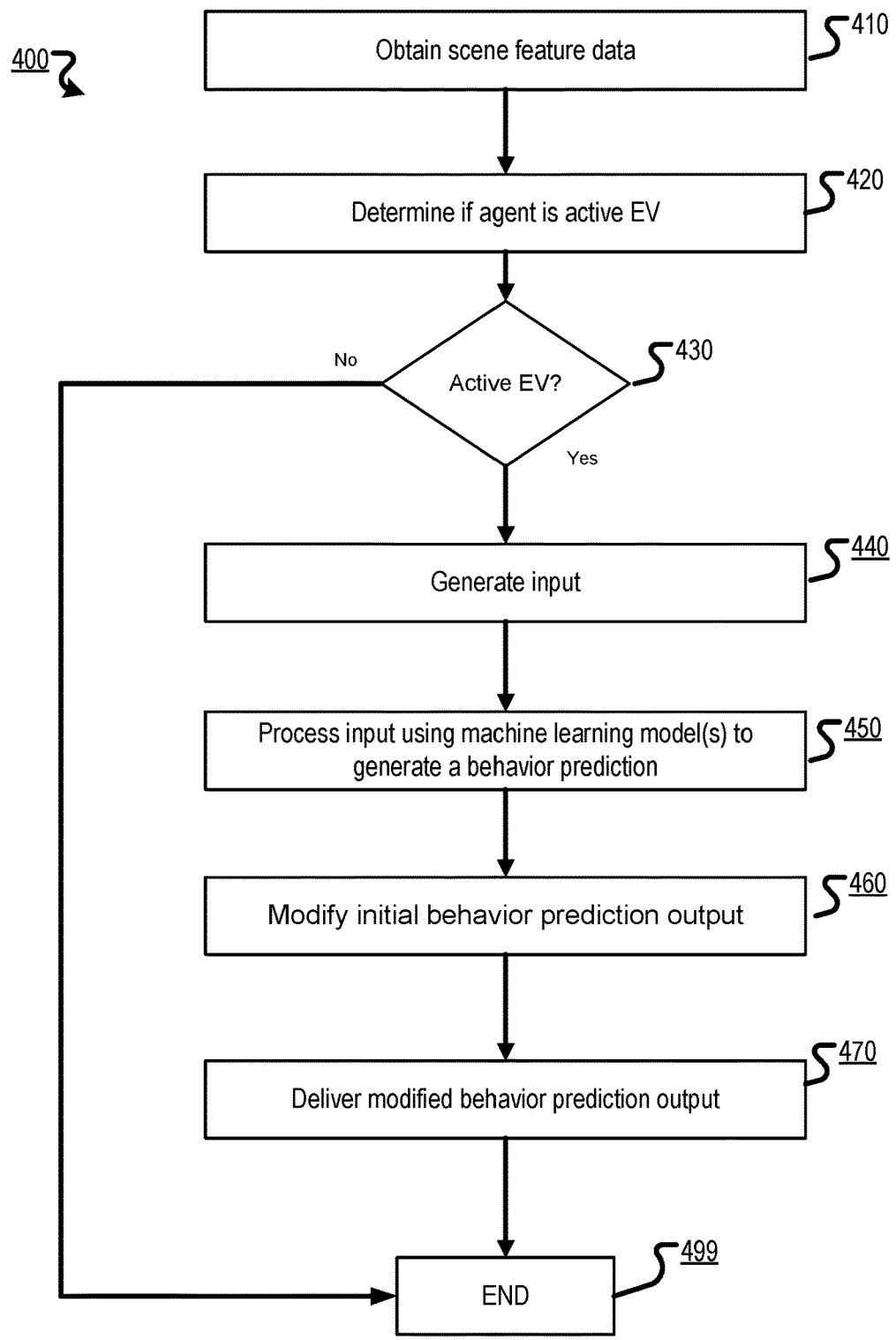

FIG. 4 is a flow diagram of an example process for creating behavior predictions for an active emergency vehicle. For convenience, the process 400 will be described as being performed by a system for creating behavior predictions for an active emergency vehicle, e.g., the system 200 of FIG. 2, appropriately programmed to perform the process. As described further below, process 400 differs from process 300 in that process 400 supplements an initial trajectory prediction output by adding specific trajectories that are unlikely to be followed by agents that are not active emergency vehicles and that are more likely to be followed by agents that are active emergency vehicles.

In operation 410, the system obtains scene feature data, e.g., as described above with reference to operation 310 of FIG. 3.

In operation 420, the system determines whether at least one agent is an active emergency vehicle, e.g., as described above with reference to operation 320 of FIG. 3.

In decision operation 430, the system proceeds to operation 440 if the scene contains at least one active emergency vehicle; the system proceeds to operation 499 if the scene does not contain an active emergency vehicle.

In operation 440, the system generates an input that includes the scene features. The system can encode the scene features using an encoder neural network.

In operation 450, the system can process features that include features of the scene (as described above) using a machine learning model that is configured to generate an initial behavior prediction for the target agent, e.g., as described above with reference to operation 350 of FIG. 3.

In operation 460, the system modifies the initial behavior prediction output that is generated by the machine learning model (e.g., as described above). The system can modify the initial behavior prediction output by adding additional trajectories or by adjusting the scores associated with some trajectories.

In some implementations, the system can add specific behaviors that are unlikely (that is, the predicted likelihood of following such a behavior is below a threshold value) to be followed by agents that are not active emergency vehicles and that are more likely (that is, the predicted likelihood of following such a trajectory is above a threshold value) to be followed by active emergency vehicles.

In some implementations, the system maintains a list of categories of such behaviors. Examples of such behavior categories can include running a red light or stop sign, driving against traffic, turning outside a turn lane, pulling over outside a parking zone, and so on. For one or more of the behavior categories, the system can generate one or more behavior predictions associated with the category, accounting for the current state of the active emergency vehicle (e.g., its speed, location, heading) and using conventional motion planning techniques.

Once the additional behavior predictions are created, the system can add the behavior predictions to the behavior prediction output to form a modified behavior prediction output and evaluate the modified behavior prediction output. In some implementations, the system can include a predefined score for each such added behavior, add each behavior and associated score into the behavior prediction output, then normalize the modified scores (that is, scores from the behavior in the initial behavior prediction output and scores for the added behavior) to produce modified behavior predictions.

In some implementations, the system can use a behavior evaluation machine learning model to determine, for each of one or more of the behavior in the initial behavior prediction output and in the added behaviors, a score that represents a likelihood that an agent will perform the behavior when it is in vicinity of an active emergency vehicle.

In some implementations, the system can cause the machine learning model to score the behavior predictions using the list of categories, e.g., by processing as input to the model both the scene data and trajectories associated with each categories.

In some implementations, when the output of the model is a probability distribution over the space of possible trajectories, for example, as described in Identifying Driver Interactions via Conditional Behavior Prediction and MultiPath: Multiple Probabilistic Anchor Trajectory Hypotheses for Behavior Prediction (cited above), the system can adjust the probability distributions for trajectories more likely to be followed by active emergency vehicles than by agents that are not active emergency vehicles by increasing the probabilities associated with those trajectories.

In some implementations, the system can cause the probability distribution generated by the machine learning model to be "anchored" at the trajectories associated with the list of categories by providing the anchors as input to the model. For example, the probability distribution can be a Gaussian Mixture Model (GMM) that has one or more conventional anchor trajectories and additional anchors generated for the list of categories.

In some implementations, the behavior evaluation machine learning model can be a classification model that processes input that can include the modified set of trajectories to assign likelihoods to each trajectory. This classification model can be a deep neural network, a random forest or other binary classification machine learning model. The model can be configured to produce as output a value between 0 and 1 that represents the probability of occurrence of each trajectory.

The behavior evaluation machine learning model can be configured to predict the trajectory of active emergency vehicles by training on datasets in which active emergency vehicles are overrepresented (as compared to the dataset in which the presence of emergency vehicles reflects their presence in a representative random sample), or by modifying the weights of certain training examples or model losses to overweight samples in which active emergency vehicles are present.

In some implementations, including implementations in which the model output defines a probability distribution over a space of possible trajectories, the system can instead adjust the probability distribution such that the probability is increased for trajectories that are more likely to be followed by an active emergency vehicle than by an agent that is not an active emergency vehicle. The system can increase the probability for such trajectories by configured amounts. The system can then store the modified probabilities in the modified behavior prediction output.

In operation 470, the system delivers the modified behavior prediction output. In some implementations, the system delivers the modified behavior prediction output to a planning system on the autonomous vehicle that is responsible for operating the vehicle, as described above.

In operation 499, the system ceases this processing iteration.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Embodiment 1 is a method comprising:

obtaining scene features of a scene in an environment that includes an autonomous vehicle and a target agent at a current time point;

determining whether the target agent is an emergency vehicle that is active at the current time point;

generating from the scene features, an input (i) that includes the scene features and (ii) that indicates whether the target vehicle is an emergency vehicle and, if so, whether the emergency vehicle is active at the current time point; and processing the input using a machine learning model that is configured to generate a behavior prediction output for the target agent that characterizes predicted future behavior of the target agent after the current time point.

Embodiment 2 is the method of embodiment 1 where the behavior prediction output includes a trajectory prediction output.

Embodiment 3 is the method of any of embodiments 1-2 where the behavior prediction output includes a driving action prediction output.

Embodiment 4 is the method of any one of embodiments 1-3 where the scene features include features of: (i) the environment and (ii) the emergency vehicle.

Embodiment 5 method of any of embodiments 1-4 where each behavior prediction output represents a likelihood that the autonomous emergency vehicle will perform a predicted driving maneuver in a future time window after the current time point.

Embodiment 6 is the method of embodiment 5 where the predicted driving maneuver is at least one of: making a U-turn, running a red light or stop sign, turning from a central travel lane, stopping in a no-stopping zone, driving against traffic and passing in a no-passing zone.

Embodiment 7 is the method of any one of embodiments 1-6 further comprising: based on determining that a set of criteria are satisfied, selecting the machine learning model from a set of one or more machine learning models, where the selected machine learning model is configured to generate one or more behavior predictions.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
obtaining scene features of a scene in an environment that includes an autonomous vehicle and a target agent at a current time point;
determining whether the target agent is an emergency vehicle that is active at the current time point;
generating from the scene features, an input (i) that includes the scene features and (ii) that indicates whether the target vehicle is an emergency vehicle that is active at the current time point;
based on determining that the target agent is an emergency vehicle, selecting a machine learning model trained to assign higher likelihoods to trajectories that are unlikely for non-emergency vehicles; and
processing the input using the selected machine learning model to generate a behavior prediction output for the target agent that characterizes predicted future behavior of the target agent after the current time point.

2. The method of claim 1 where the behavior prediction output includes a trajectory prediction output.

3. The method of claim 1 where the behavior prediction output includes a driving action prediction output for the emergency vehicle.

4. The method of claim 1 where the scene features include features of: (i) the environment and (ii) the emergency vehicle.

5. The method of claim 1 where each behavior prediction output represents a likelihood that the active emergency vehicle will perform a predicted driving maneuver in a future time window after the current time point.

6. The method of claim 5 where the predicted driving maneuver is at least one of:
making a U-turn, running a red light or stop sign, turning from a central travel lane, stopping in a no-stopping zone, driving against traffic and passing in a no-passing zone.

7. A system comprising one or more computers and one or more storage devices storing instructions that when executed by the one or more computers cause the one or more computers to perform operations comprising:
obtaining scene features of a scene in an environment that includes an autonomous vehicle and a target agent at a current time point;
determining whether the target agent is an emergency vehicle that is active at the current time point;
generating from the scene features, an input (i) that includes the scene features and (ii) that indicates whether the target vehicle is an emergency vehicle that is active at the current time point;
based on determining that the target agent is an emergency vehicle, selecting a machine learning model trained to assign higher likelihoods to trajectories that are unlikely for non-emergency vehicles; and
processing the input using the selected machine learning model to generate a behavior prediction output for the target agent that characterizes predicted future behavior of the target agent after the current time point.

8. The system of claim 7 where the behavior prediction output includes a trajectory prediction output.

9. The system of claim 7 where the behavior prediction output includes a driving action prediction output for the emergency vehicle.

10. The system of claim 7 where the scene features include features of: (i) the environment and (ii) the emergency vehicle.

11. The system of claim 7 where each behavior prediction output represents a likelihood that the active emergency vehicle will perform a predicted driving maneuver in a future time window after the current time point.

12. The system of claim 11 where the predicted driving maneuver is at least one of: making a U-turn, running a red light or stop sign, turning from a central travel lane, stopping in a no-stopping zone, driving against traffic and passing in a no-passing zone.

13. One or more non-transitory computer-readable storage media storing instructions that when executed by one or more computers cause the one or more computers to perform operations comprising:
obtaining scene features of a scene in an environment that includes an autonomous vehicle and a target agent at a current time point;
determining whether the target agent is an emergency vehicle that is active at the current time point;
generating from the scene features, an input (i) that includes the scene features and (ii) that indicates whether the target vehicle is an emergency vehicle that is active at the current time point;
based on determining that the target agent is an emergency vehicle, selecting a machine learning model trained to assign higher likelihoods to trajectories that are unlikely for non-emergency vehicles; and
processing the input using the selected machine learning model to generate a behavior prediction output for the target agent that characterizes predicted future behavior of the target agent after the current time point.

14. The one or more non-transitory computer-readable storage media of claim 13 where the behavior prediction output includes a trajectory prediction output.

15. The one or more non-transitory computer-readable storage media of claim 13 where the behavior prediction output includes a driving action prediction output for the emergency vehicle.

16. The one or more non-transitory computer-readable storage media of claim 13 where the scene features include features of: (i) the environment and (ii) the emergency vehicle.

17. The one or more non-transitory computer-readable storage media of claim 13 where each behavior prediction output represents a likelihood that the active emergency vehicle will perform a predicted driving maneuver in a future time window after the current time point.

* * * * *